(12) United States Patent
Cho et al.

(10) Patent No.: US 9,212,236 B2
(45) Date of Patent: Dec. 15, 2015

(54) POLYACRYLONITRILE-BASED POLYMER SOLUTION, PREPARING METHOD OF THE SAME, CARBON FIBER PRECURSOR, MANUFACTURING METHOD OF THE SAME AND MANUFACTURING METHOD OF CARBON FIBER USING THE SAME

(75) Inventors: Eun Jeong Cho, Soengnam-si (KR); Joon Young Yoon, Kumi-si (KR); In Sik Han, Daegu (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 643 days.

(21) Appl. No.: 13/521,081

(22) PCT Filed: Dec. 17, 2010

(86) PCT No.: PCT/KR2010/009085
§ 371 (c)(1),
(2), (4) Date: Jul. 9, 2012

(87) PCT Pub. No.: WO2011/074918
PCT Pub. Date: Jun. 23, 2011

(65) Prior Publication Data
US 2012/0319315 A1      Dec. 20, 2012

(30) Foreign Application Priority Data

Dec. 18, 2009   (KR) .................. 10-2009-0126518

(51) Int. Cl.
  *D01C 5/00*    (2006.01)
  *C08F 20/44*   (2006.01)
  *D01F 6/38*    (2006.01)
  *D01F 9/22*    (2006.01)

(52) U.S. Cl.
  CPC . *C08F 20/44* (2013.01); *D01F 6/38* (2013.01); *D01F 9/22* (2013.01)

(58) Field of Classification Search
  USPC .............. 264/29.2, 29.5, 29.6, 640, 641, 205, 264/206, 182
  See application file for complete search history.

(56) References Cited

U.S. PATENT DOCUMENTS

2010/0003515 A1 *  1/2010  Tanaka et al. ................. 428/367

* cited by examiner

*Primary Examiner* — Stella Yi
(74) *Attorney, Agent, or Firm* — Sughrue Mion, PLLC

(57) ABSTRACT

Disclosed is a method for manufacturing carbon fiber which comprises the use of un-reacted raw material monomers in solution to prepare the precursor fiber for making the carbon fiber, and a relatively short passage period through hydrogen, which reduce production costs and increase returns. The present invention further comprises the carbon fiber precursors made thereby.

13 Claims, No Drawings

POLYACRYLONITRILE-BASED POLYMER SOLUTION, PREPARING METHOD OF THE SAME, CARBON FIBER PRECURSOR, MANUFACTURING METHOD OF THE SAME AND MANUFACTURING METHOD OF CARBON FIBER USING THE SAME

CROSS REFERENCE TO RELATED APPLICATIONS

This application is a National Stage application of International Application No. PCT/KR2010/009085 filed Dec. 17, 2010, claiming priority based on Korean Patent Application No. 10-2009-0126518 filed Dec. 18, 2009, the contents of all of which are incorporated herein by reference in their entirety.

TECHNICAL FIELD

The present invention relates to carbon fiber precursor fibers, a method of manufacturing the same, and a method of manufacturing carbon fibers using the same.

BACKGROUND ART

Because carbon fibers have higher specific strength and specific modulus compared to other fibers, these carbon fibers are variously utilized in general industrial uses including cars or civil engineering and construction, pressure vessels and windmill blades, in addition to conventional uses such as sporting purposes or aerospace applications, as reinforced fibers used in composite materials. Thus, there is a strong demand to increase productivity or production stability.

Carbon fibers, in particular, polyacrylonitrile (hereinafter there may be cases where this is abbreviated to PAN) based carbon fibers, have been industrially produced by subjecting a spinning solution including a precursor of the above carbon fibers, namely, a PAN-based polymer to wet spinning, dry spinning or dry/wet spinning to obtain carbon-fiber precursor fibers, which are then heated in an oxidation atmosphere to be converted into flameproof fibers, followed by heating such fibers in an inert atmosphere to carbonize them.

Unlike the acrylic fibers used in clothes, the polyacrylonitrile-based fibers, which are a useful precursor of carbon fibers, are an intermediate product required for the manufacture of the final product of carbon fibers. Accordingly there is a need for polyacrylonitrile-based fibers from which carbon fibers can be produced which have superior quality and performance, and also in the course of spinning precursor fibers, the polyacrylonitrile-based fibers exhibit good stability and may be provided at low cost with high productivity upon burning to form carbon fibers, which is regarded as being very important.

DISCLOSURE

Technical Problem

Accordingly, the present invention is intended to provide a method of manufacturing carbon-fiber precursor fibers at low cost with high productivity.

In addition, the present invention is intended to provide carbon-fiber precursor fibers which may shorten the flameproofing treatment time when manufacturing carbon fibers.

In addition, the present invention is intended to provide a method of manufacturing carbon fibers at low cost with high productivity while reducing the flameproofing treatment time.

Technical Solution

According to a preferred embodiment of the present invention, there is provided a method of preparing a polyacrylonitrile-based polymer solution, using at least one compound selected from among ammonium hydroxide substituted M with C1~C6 alkyl or C6~C21 aromatic alkyl, amine substituted with C1~C6 alkyl or C6~C21 aromatic alkyl, and melamine unsubstituted or substituted with C1~C6 alkyl as a polymerization terminator in the presence of a solvent.

According to a specific embodiment of the present invention, the method of preparing the polyacrylonitrile-based polymer solution may include polymerizing 85 mol % or more of acrylonitrile based on a total monomer and a balance of a monomer which is copolymerizable with the acrylonitrile, thus preparing a polyacrylonitrile-based polymer, which is then neutralized with at least one compound selected from among ammonium hydroxide substituted with C1~C6 alkyl or C6~C21 aromatic alkyl, amine substituted with C1~C6 alkyl or C6~C21 aromatic alkyl, and melamine unsubstituted or substituted with C1~C6 alkyl as the polymerization terminator.

In this method, the polymerization terminator may be at least one selected from among tetraethylene ammonium hydroxide, tribenzylamine and melamine.

In this method, the polymerization terminator may be used in the same amount as that of the monomer which is copolymerizable with the acrylonitrile.

An embodiment of the present invention provides a polyacrylonitrile-based polymer solution containing a polyacrylonitrile-based polymer which is provided in salt form with an ammonium ion substituted with C1~C6 alkyl or C6~C21 aromatic alkyl or in salt form of melamine.

Preferably, the polyacrylonitrile-based polymer solution includes a solid content of 15~25 wt %.

Another embodiment of the present invention provides a method of manufacturing a carbon-fiber precursor fiber, comprising preparing a polyacrylonitrile-based polymer solution using at least one compound selected from among ammonium hydroxide substituted with C1~C6 alkyl or C6~C21 aromatic alkyl, amine substituted with C1~C6 alkyl or C6~C21 aromatic alkyl, and melamine unsubstituted or substituted with C1~C6 alkyl as a polymerization terminator in the presence of a solvent; and spinning a spinning solution containing the polyacrylonitrile-based polymer thus manufacturing the carbon-fiber precursor fiber.

In this method, preparing the polyacrylonitrile-based polymer solution may be performed by polymerizing 85 mol % or more of acrylonitrile based on the total monomer and a balance of a monomer which is copolymerizable with the acrylonitrile, thus preparing a polyacrylonitrile-based polymer, which is then neutralized with at least one compound selected from among ammonium hydroxide substituted with C1~C6 alkyl or C6~C21 aromatic alkyl, amine substituted with C1~C6 alkyl or C6~C21 aromatic alkyl, and melamine unsubstituted or substituted with C1~C6 alkyl as the polymerization terminator.

In this method, the polymerization terminator may be at least one selected from among tetraethylene ammonium hydroxide, tribenzylamine and melamine.

In this method, the polymerization terminator may be used in the same amount as that of the monomer which is copolymerizable with the acrylonitrile.

In this method, the polyacrylonitrile-based polymer solution may include a solid content of 15~25 wt %.

Still another embodiment of the present invention provides a carbon-fiber precursor fiber comprising a polymer including a polyacrylonitrile-based polymer which is provided in salt form with an ammonium ion substituted with C1~C6 alkyl or C6~C21 aromatic alkyl or in salt form of melamine.

Yet another embodiment of the present invention provides a method of manufacturing a carbon fiber, comprising preparing a polyacrylonitrile-based polymer solution using at least one compound selected from among ammonium hydroxide substituted with C1~C6 alkyl or C6~C21 aromatic alkyl, amine substituted with C1~C6 alkyl or C6~C21 aromatic alkyl, and melamine unsubstituted or substituted with C1~C6 alkyl as a polymerization terminator in the presence of a solvent; spinning a spinning solution containing the polyacrylonitrile-based polymer thus manufacturing a carbon-fiber precursor fiber; heating the carbon-fiber precursor fiber in an oxidation atmosphere, thus converting the carbon-fiber precursor fiber into a flameproof fiber; and heating the flameproof fiber in an inert atmosphere so that the flameproof fiber is carbonized.

Advantageous Effects

According to the present invention, a method of preparing a polyacrylonitrile-based polymer solution can increase the rate of recovery of a solvent and an unreacted monomer thus reducing the preparation cost. When this method is applied to a method of manufacturing carbon-fiber precursor fibers, the same effects can be obtained, Also, the resulting carbon-fiber precursor fibers are subjected to flameproofing treatment and carbonization to manufacture carbon fibers, thereby reducing the flameproofing treatment time.

Best Mode

Hereinafter, a detailed description will be given of the present invention.

According to the present invention, carbon-fiber precursor fibers are composed of a polymer including a polyacrylonitrile-based polymer (there may be cases where this is abbreviated to a "PAN-based polymer"). The polyacrylonitrile-based polymer indicates a polymer containing acrylonitrile as a main component, and specifically, a polymer containing 85 mol % or more of acrylonitrile based on the total monomer.

The polyacrylonitrile-based polymer may be obtained by adding a polymerization initiator to a solution including a monomer composed mainly of acrylonitrile (there may be cases where this is abbreviated to "AN") and then performing solution polymerization. In addition to solution polymerization, suspension polymerization or emulsion polymerization may also be used.

The monomer may include, in addition to acrylonitrile, a monomer copolymerizable with acrylonitrile, and this monomer functions to accelerate flameproofness and examples thereof include acrylic acid, methacrylic acid and itaconic acid.

After the polymerization, a neutralization process is typically carried out using a polymerization terminator, which plays a role in preventing the spinning solution containing the polyacrylonitrile-based polymer from rapidly solidifying in a solidification bath upon spinning.

A typical example of the polymerization terminator includes ammonia. However, ammonia is compatible with dimethylsulfoxide mainly useful as a polymerization solvent or a solvent for a spinning solution and with acrylonitrile which is left behind as an unreacted monomer, making it difficult to recover the pure solvent and, unreacted monomer.

Recovering the solvent and the unreacted monomer is essential in terms of ensuring that the production of carbon fiber precursor fibers is economically beneficial. However, when the recovering process is performed using ammonia as a polymerization terminator, a small amount of ammonia may exist in the recovered solvent and unreacted monomer. In the case where the solvent and monomer recovered as above are used again in the polymerization process, ammonia which exists in a small amount may participate in the reaction, making it difficult to prepare a polymer having high molecular weight. In this case, low-grade polyacrylonitrile-based carbon-fiber precursor fibers may be manufactured or converted into acrylic polymers used in clothes.

Taking into consideration the above problems, an embodiment of the present invention provides a polymerization terminator necessary for preparing the polyacrylonitrile-based polymer, including, instead of ammonia, at least one selected from among ammonium hydroxide substituted with C1~C6 alkyl or C6~C21 aromatic alkyl, amine substituted with C1~C6 alkyl or C6~C21 aromatic alkyl, and melamine unsubstituted or substituted with C1~C6 alkyl, The monomer composed mainly of acrylonitrile is polymerized thus preparing a polymer, which is then neutralized using the above polymerization terminator, thereby preparing a solution containing a polyacrylonitrile-based polymer which is in salt form with ammonium ion substituted with C1~C6 alkyl or C6~C21 aromatic alkyl or in salt form of melamine.

The amount of the polymerization terminator may be the same as that of the monomer that is copolymerizable with acrylonitrile.

The polyacrylonitrile-based polymer obtained using the polymerization terminator facilitates phase separation between the solvent and the unreacted monomer, that is, acrylonitrile, making it possible to recover a high-purity solvent and acrylonitrile, compared to a polyacrylonitrile-based polymer which is in the form of a simple ammonium salt.

Specific examples of the polymerization terminator include tetraethylene ammonium hydroxide, tribenzylamine and melamine, Meanwhile, the polymerization initiator used in the polymerization is not particularly limited but includes oil soluble azo-based compounds, water-soluble azo-based compounds, and peroxides. Preferably useful is an azo-based compound in terms of safe handleability, industrially efficient polymerization, and preventing the generation of oxygen that retards polymerization upon decomposition. Upon solution polymerization, an oil-soluble azo compound is preferable in terms of solubility. Specific examples of the polymerization initiator include 2,2'-azobis(4-methoxy-2,4-dimethylvaleronitrile), 2,2'-azobis(2,4'-dimethylvaleronitrile), and 2,2'-azobisisobutyronitrile.

The polymerization temperature may vary depending on the kind and amount of the polymerization initiator, and is preferably set to 30~90° C.

The resulting polyacrylonitrile-based polymer solution is a solution containing a polyacrylonitrile-based polymer which is in salt form with ammonium ion substituted with C1~C6 alkyl or C6~C21 aromatic alkyl or in salt form of melamine.

When the solid content of the solution containing the polyacrylonitrile-based polymer is 15~25 wt %, this solution is favorable as a spinning solution used to manufacture carbon-fiber precursor fibers in terms of facilitating the removal of the solvent during spinning, preventing formation of tar or impurities in the flameproofing process used to manufacture carbon fibers, and maintaining a uniform density of filaments.

The solution containing the polyacrylonitrile-based polymer may be used as a spinning solution in the production of carbon-fiber precursor fibers. Such a spinning solution is spun thereby obtaining carbon-fiber precursor fibers. The spinning solution may include a polyacrylonitrile-based copolymer and a solvent such as an organic or inorganic solvent. Examples of the organic solvent include dimethylsulfoxide, dimethylformamide, dimethylacetamide and so The spinning process may include dry spinning, wet spinning, or dry/wet spinning.

The dry spinning process is performed by discharging the spinning solution via orifices of a spinneret at high temperature in a gas atmosphere, evaporating the solvent and then performing concentration and solidification. Because the winding rate is the rate that governs evaporation of the solvent, when the winding rate increases, a closed type spinning chamber may undesirably increase.

The wet spinning process is used to discharge the spinning solution via the orifices of a spinneret in a solidification bath. High swelling occurs which corresponds to at least three times the initial volume of the spinning solution immediately after the spinning solution is discharged through the orifices of the spinneret. Solidification takes place as the swelling is occurring. As the winding rate increases, a substantial spinning draft rate increases. However, the actual draft rate is drastically increased, undesirably breaking yarns on the surface of the spinneret, Thus limitations may be imposed on increasing the degree of increasing a take-up speed.

Also, the dry/wet spinning process is performed by discharging the spinning solution in air (air gap), and conducting surface crystallization and guiding in a solidification bath, and thus the actual spinning draft rate is absorbed by the solution in the air gap, thus enabling rapid spinning.

Furthermore, melt spinning and other known processes may be utilized.

Preferably in accordance with a wet spinning process or a dry/wet spinning process, the spinning solution is discharged using a spinneret, and placed in a solidification bath to solidify fibers.

The solidification rate or the stretching process may be appropriately set depending on the purposes of desired flameproof fibers or carbon fibers.

The solidification bath may include a solidification promoter, as well as a solvent such as dimethylsulfoxide, dimethylformamide or dimethylacetamide. The solidification promoter is preferably one which does not dissolve a polyacrylonitrile-based polymer and is compatible with the solvent used in the spinning solution, for example, water.

The temperature of the solidification bath and the amount of the solidification promoter may be appropriately selected depending on the purposes of the desired flameproof fibers or carbon fibers.

The spun polymer is discharged into the solidification bath, and the resulting strands are solidified, after which water washing, stretching, emulsion addition (oiling), and dry densification are performed thus obtaining carbon-fiber precursor fibers. As such, the strands solidify and may then be directly stretched in a stretching bath without water washing, or the solvent may be removed via water washing and then stretching may be additionally carried out in a stretching bath. Also, to manufacture a strong carbon-fiber precursor after addition of the emulsion, stretching using steam may be conducted.

Adding an emulsion, for example silicone, to the strands is preferable in order to prevent adhesion of monofilaments. Such a silicone emulsion may be modified silicone, particularly reticulated modified silicone haying high heat resistance.

The carbon-fiber precursor fibers obtained as above include a polyacrylonitrile-based polymer which is provided in the form of a salt with ammonium ion substituted with C1~C6 alkyl or C6~C21 aromatic alkyl or in the form of a salt of melamine.

The monofilament fineness of the carbon-fiber precursor fibers obtained as above is 0.01~3.0 dtex, preferably 0.05~1.5 dtex, and more preferably 0.8~1.5 dtex. If the fineness of the monofilaments is too small, yarns may break due to contact with a roller or a guide, and the process stability in a reeling process and a carbon fiber burning process may deteriorate. In contrast, if the fineness of the monofilament is too large, a difference in the inner and outer structures of respective monofilaments increases after flameproofing treatment, and thus processability in the subsequent carbonization process may deteriorate, or the tensile strength and tensile modulus of the resulting carbon fibers may decrease. Specifically, if the fineness falls out of the above range, burning efficiency may drastically decrease. In the present invention, monofilament fineness (dtex) means weight (g) per 10,000 m of monofilament.

The degree of crystal orientation of the carbon-fiber precursor fibers of the invention is 85% or more, and preferably 90% or more. If the degree of crystal orientation is less than 85%, the strength of the resulting precursor fibers may decrease.

Below is a description. of the process of manufacturing carbon fibers from the carbon-fiber precursor fibers including the polyacrylonitrile-based polymer in such a salt form.

The carbon-fiber precursor fibers manufactured using the above method are subjected to flameproofing treatment while being stretched at 200~300° C. in air. When the flameproofing is performed using the carbon-fiber precursor fibers obtained by the method of the invention, air permeability may increase due to a bulky salt structure, thus reducing the flameproofing treatment time compared to when using carbon-fiber precursor fibers in typical ammonium salt form.

Subsequently, pre-carbonization is performed at 300~800° C. in an inert atmosphere while conducting stretching depending on the needs, and carbonization is conducted at a maximum temperature of 1,000~3,000° C. in an inert atmosphere while conducting stretching depending on the end uses, thus preparing carbon fibers.

The pre-carbonization or the carbonization is performed in an inert atmosphere, and a gas used in an inert atmosphere includes nitrogen, argon and xenon. Particularly useful is nitrogen in terms of economic benefits. The maximum temperature upon carbonization may be 1,000~3,000° C. depending on dynamic properties of desired carbon fibers. As the maximum temperature of carbonization increases, tensile modulus of the resulting carbon fibers is increased but tensile strength is maximized at about 1,500° C. In order to increase both tensile strength and tensile, modulus, the maximum temperature of carbonization is preferably set to 1,200~1700° C., and more preferably 1,300~1,600° C.

Taking into consideration aircraft applications, lightweightness is important and tensile modulus has to increase. To this end, the maximum temperature of carbonization is set to 1,700~2,300° C. As the maximum temperature of carbonization increases, the tensile modulus is increased but graphitization progresses, and carbon grids may easily buckle attributed to the growth and layering thereof, undesirably lowering the compressive strength. In consideration of the balance between these properties, the carbonization temperature is determined, The obtained carbon fibers may be electrolyzed to reform the surface thereof. The electrolytic solution used in electrolytic treatment is an acidic solution such as sulfuric acid, nitric acid and hydrochloric acid, or an aqueous solution of an alkali or its salt of sodium hydroxide, potassium hydroxide, tetraethyl ammonium hydroxide, ammonium carbonate and, ammonium bicarbonate. The amount of electric current to use for the electrolytic treatment may be appropriately selected depending on the degree of carbonization of applied carbon fibers.

Such electrolytic treatment enables the adhesion to a carbon fiber matrix in a fiber reinforced composite material to be appropriately controlled, thus solving problems including brittle breakdown of the composite material due to strong adhesion, deterioration of tensile strength in a fiber direction, and low adhesion to resin despite high tensile strength in a fiber direction making it impossible to exhibit strength properties in a non-fiber direction. The resulting fiber reinforced composite material can manifest strength properties which are balanced in both of the fiber direction and the non-fiber direction.

After electrolytic treatment, sizing treatment may be performed to impart the carbon fibers with convergence. A sizing agent may be appropriately selected so long as it has good compatibility with a matrix resin depending on the type of resin used.

The carbon fibers of the invention may be subjected to a variety of molding processes, such as autoclave molding as a prepreg, resin transfer molding as a perform of fabrics and the like, filament winding, etc., and thus may he utilized in aircrafts, pressure vessels, cars, fishing rods, and sport members such as golf shafts, etc.

MODE FOR INVENTION

Below, the present invention will be more fully described via the following examples but such examples do not limit the scope of the invention.

Example 1

Copolymer components including 95 mol % of acrylonitrile, 3 mol % of methacrylic acid and 2 mol % of itaconic acid were subjected to solution polymerization using dimethylsulfoxide as a solvent, after which neutralization was carried out using tribenzylamine in the same amount as that of itaconic acid, thus preparing a polyacrylonitrile-based copolymer in tribenzylammonium salt form, thereby obtaining a spinning solution containing 22 wt % of the copolymer components.

This spinning solution was discharged via two spinnerets (temperature: 45° C., diameter: 0.08 mm, No. of orifices: 6,000), and placed in a solidification bath containing an aqueous solution of 40% dimethylsulfoxide at 45° C., thus preparing solidified fibers.

The solidified fibers were washed with water, stretched four times in warm water, and added with a reticulated modified silicone-based emulsion, thus obtaining stretched fibers.

Such stretched fibers were dry densified using a hot roller at 150° C., and then stretched using stream under pressure thus obtaining a polyacrylonitrile-based fiber bundle having a stretching ratio of 10 times before reeling, a monofilament fineness of 1.5 dtex and 12,000 filaments. These fibers are referred to as carbon-fiber precursor fibers.

After completion of the spinning, the solution of the solidification bath and the water washing bath was collected into a recovery bath and then distilled off, thus recovering an unreacted monomer and a dimethylsulfoxide solvent.

Example 2

Carbon-fiber precursor fibers were manufactured in the same manner as in Example 1, with the exception that tetraethylene ammonium hydroxide was used instead of tribenzylamine.

The resulting polyacrylonitrile-based fiber bundle had a monofilament fineness of 1.1 dtex and 12,000 filaments.

Example 3

Carbon-fiber precursor fibers were manufactured in the same manner as in Example 1, with the exception that melamine was used instead of tribenzylamine.

The resulting polyacrylonitrile-based fiber bundle had a monofilament fineness of 1.3 dtex and 12,000 filaments.

Example 4

Carbon-fiber precursor fibers were manufactured in the same manner as in Example 2, with the exception that a copolymer comprising 99.5 mol % of acrylonitrile and 0.5 mol % of itaconic acid was used.

The resulting polyacrylonitrile-based fiber bundle had a monofilament fineness of 1.3 dtex and 12,000 filaments.

Comparative Example 1

Carbon-fiber precursor fibers were manufactured in the same manner as in Example 1, with the exception that ammonia was used instead of tribenzylamine, The resulting polyacrylonitrile-based fiber bundle had a monofilament fineness of 1.1 dtex and 12,000 filaments.

Comparative Example 2

Carbon-fiber precursor fibers were manufactured in the same manner as in Example 4, with the exception that ammonia was used instead of tribenzylamine.

The resulting polyacrylonitrile-based fiber bundle had a monofilament fineness of 1.5 dtex and 12,000 filaments.

The solution recovered from Examples 1 to 4 and Comparative Examples 1 and 2 was analyzed via the following method using GC-MASS (Varian 4000 GC-MS). The results are W shown in Table 1 below. In Table 1, the unit is a percentage (wt %) of each component based on the total amount of the recovered solution, in which a very small amount of water or other impurities other than the main components are not shown in Table 1, and this amount will be understood to be the amount obtained by subtracting the amounts represented in Table 1 from the total amount of 100 wt %.

GC-MASS Analysis Method
Instrument: Varian 4000 GC-MS
Stationary Phase: VF-5 ms (30 m×0.25 mm×0.25 um)
Mobile Phase: He, 1.0 ml/min
Temperature Programming: From 80° C., 2 min to 280° C., 8 min (@20° C./min)
Injection: 0.4 μl, Split=20:1 , 250° C.
Detection: EI mode (28~500 m/z scan)

TABLE 1

|  | Solvent | Unreacted Monomer | Polymerization Terminator (Amine or Ammonium) |
|---|---|---|---|
| Ex. 1 | 99.7 wt % | 0 | 0 |
| Ex. 2 | 99.7 wt % | 0 | 0 |
| Ex. 3 | 99.8 wt % | 0 | 0 |
| Ex. 4 | 99.8 wt % | 0 | 0 |
| Comp. Ex. 1 | 99.2 wt % | 0 | 0.3 wt % |
| Comp. Ex. 2 | 99.4 wt % | 0 | 0.07 wt % |

Example 5

The polyacrylonitrile-based fiber bundle of Example 1 was not substantially twisted but was subjected to flameproofing treatment at 220~270° C. for 80 min in an air atmosphere at a rate of 4 m/min.

Subsequently, pre-carbonization was performed at 400~700° C. in an inert atmosphere, and then carbonization was finally carried out at 1,350° C.

Example 6

Carbon fibers were manufactured in the same manner as in Example 5, with the exception that the polyacrylonitrile-based fiber bundle of Example 2 was used, The flameproofing treatment was carried out under the same temperature conditions as in Example 1 for 90 min.

Example 7

Carbon fibers were manufactured in the same manner as in Example 5, with the exception that the polyacrylonitrile-based fiber bundle of Example 3 was used.

The flameproofing treatment was carried out under the same temperature conditions as in Example 1 for 80 min.

Example 6

Carbon fibers were manufactured in the same manner as in Example 5, with the exception that the polyacrylonitrile-based fiber bundle of Example 4 was used.

The flameproofing treatment was carried out under the same temperature conditions as in Example 1 for 100 min.

Comparative Example 3

Carbon fibers were manufactured in the same manner as in Example 5, with the exception that the polyacrylonitrile-based fiber bundle of Comparative Example 1 was used.

The flameproofing treatment was carried out under the same temperature conditions as in Example 1 for 120 min.

Comparative Example 4

Carbon fibers were manufactured in the same manner as in Example 5, with the exception that the polyacrylonitrile-based fiber bundle of Comparative Example 2 was used.

The flameproofing treatment was carried out under the same temperature conditions as in. Example 1 for 120 min.

Whether the flameproofing treatment was completed for the flameproof in time given in Examples 5 to 8 and Comparative Examples 3 and 4 was evaluated using a match test. The results are shown in Table 2 below.

The evaluation criteria are as follows.

○: fibers turned red and then went out when ignited using a lighter.

x: fibers were burned when ignited using a lighter.

TABLE 2

|  | 80 min | 100 min | 120 min |
| --- | --- | --- | --- |
| Ex. 5 | ○ | ○ | ○ |
| Ex. 6 | x | ○ | ○ |
| Ex. 7 | ○ | ○ | ○ |
| Ex. 8 | x | ○ | ○ |
| Comp. Ex. 3 | x | x | ○ |
| Comp. Ex. 4 | x | x | ○ |

The invention claimed is:

1. A method of preparing a polyacrylonitrile-based polymer solution, comprising
    subjecting acrylonitrile to a polymerization to prepare a polyacrylonitrile-based polymer; and
    subjecting the produced polyacrylonitrile-based polymer to a neutralization using at lest one compound selected from the group consisting of an ammonium hydroxide substituted with C1~C6 alkyl or C6~C21 aromatic alkyl, an amine substituted with C1~C6 alkyl or C6~C21 aromatic alkyl, and a melamine unsubstituted or substituted with C1~C6 alkyl as a polymerization terminator in presence of a solvent to produce a solution containing a polyacrylonitrile-based polymer which is in salt form with ammonium ion substituted with C1-C6 alkyl or C6-C21 aromatic alkyl or in salt form of melamine.

2. The method of claim 1, wherein
    polymerizing 85 mol % or more of acrylonitrile based on a total monomer and a balance of a monomer which is copolymerizable with the acrylonitrile, to give a polyacrylonitrile-based polymer.

3. The method of claim 1, wherein the at least one compound selected from the group consisting of tetraethylene ammonium hydroxide, tribenzylamine and melamine.

4. The method of claim 2, wherein the at least one compound is used in a same amount as that of the monomer which is copolymerizable with the acrylonitrile.

5. A method of manufacturing a carbon-fiber precursor fiber, comprising:
    subjecting acrylonitrile to a polymerization to prepare a polyactylonitrile-based polymer;
    subjecting the produced polyarylonitrile-based polymer to a neutraliztion using at least on compound selected from the group consisting of an ammonium hydroxide substituted with C1-C6 alkyl or C6-C21 aromatic alkyl, an amine substituted with C1-C6 alkyl or C6-C21 aromatic alkyl, and a melamine unsubstituted or substituted with C1-C6 alkyl as a polymerization terminator in presence of a solvent to produce a solution containing a polyacrylonitrile-based polymer which is in salt form with ammonium ion substituted with C1-C6 alkyl or C6-C21 aromatic alkyl or in salt form of melamine; and
    spinning the solution containing a polyacrylonitrile-based polymer to give the carbon-fiber precursor fiber.

6. The method of claim 5, wherein the polymerization comprises:
    polymerizing 85 mol % or more of acrylonitrile based on a total monomer and a balance of a monomer which is copolymerizable with the acrylonitrile, to give the polyacrylonitrile-based polymer.

7. The method of claim 5, wherein the at least on compound selected from the group consisting of tetraethylene ammonium hydroxide, tribenzylamine and melamine.

8. The method of claim 5, wherein the at least on compound is used in a same amount as that of the monomer which is copolymerizable with the acrylonitrile.

9. The method of claim 5, wherein the polyacrylonitrile-based polymer solution includes a solid content of 15~25 wt %.

10. A method of manufacturing a carbon fiber, comprising:
    subjecting acrylonitrile to a polymerization to prepare a polyactylonitrile-based polymer;
    subjecting the produced polyarylonitrile-based polymer to a neutraliztion using at least on compound selected from the group consisting of an ammonium hydroxide substituted with C1-C6 alkyl or C6-C21 aromatic alkyl, an amine substituted with C1-C6 alkyl or C6-C21 aromatic alkyl, and a melamine unsubstituted or substituted with C1-C6 alkyl as a polymerization terminator in presence of a solvent to produce a solution containing a polyacrylonitrile-based polymer which is in salt form with ammonium ion substituted with C1-C6 alkyl or C6-C21 aromatic alkyl or in salt form of melamine;

spinning the solution containing the polyacrylonitrile-based polymer to give a carbon-fiber precursor fiber;

heating the carbon-fiber precursor fiber in an oxidation atmosphere, to convert the carbon-fiber precursor fiber into a flameproof fiber; and heating the flameproof fiber in an inert atmosphere, to carbonize the flameproof fiber.

11. The method of claim 2, wherein the at least one compound is selected from the group consisting of tetraethylene ammonium hydroxide, tribenzylamine and melamine.

12. The method of claim 6, wherein the at least one compound is selected from the group consisting of tetraethylene ammonium hydroxide, tribenzylamine and melamine.

13. The method of claim 6, wherein the polyacrylonitrile-based polymer solution includes a solid content of 15-25 wt %.

* * * * *